Fig-1-

Patented May 23, 1933

1,910,219

UNITED STATES PATENT OFFICE

JOHN G. HOPKINS, ROLLON F. THURLOW, AND ROBERT S. FEELEY, OF SYRACUSE, NEW YORK

MACHINE AND METHOD FOR MAKING TRIAL DESIGNS FOR WOVEN ARTICLES

Application filed June 30, 1931. Serial No. 547,926.

In weaving rugs, carpets etc., the design or figure of the rug is first drawn and colored by an artist, as on a paper sheet, so as to give some idea of how the design will appear when duplicated in the rug etc. However, it has been necessary to make trial runs in the loom, or to weave trial pieces to determine how the design will actually appear in the rug. Oftentimes, the design as it appears in the trial piece has a different appearance than the design as prepared by the artist on paper, and a number of trial runs are oftentimes made before the design as duplicated in the rug etc., is satisfactory.

This invention has for its object, the elimination of the trial runs, and a machine for setting up the design in colored fabric in a frame so that it can be seen almost exactly how the design will appear when woven in the rug, carpet etc.

The invention consists in the novel features and in the combinations and constructions hereinafter set forth and claimed.

In describing this invention, reference is had to the accompanying drawings in which like characters designate corresponding parts in all the views.

This machine comprises generally, a suitable frame, a perforated, reticulated or cellular plate having rows and columns of cells for receiving blocks, squares, or other pieces of fabric making up the design to be duplicated in a rug, carpet, or other woven article, a carrier element for the plate, a second carrier element, a punch, and ribbon feeding mechanism supported by the second element, the punch mechanism including a plate provided with a punch hole for alinement with the cells, the ribbons being shiftable selectively over the punch hole in the path of the punch, means for shifting the ribbons to select the one to be punched, means for effecting relative movement of the carriers to bring the punch hole and the cells of one row one by one into alinement, and for spacing from one row to another, and for actuating the punch to cut out a block from the selected ribbon and push it into the alined cell and feed the selected ribbon one step for the next operation, and in the same operation again effecting relative movement of the carriers to set the parts for the next punching operation with the punch hole in alinement with another cell.

The machine further includes an index for pointing out on a painted guide pattern or design on a sheet, the color of the ribbon to be selected for the next punching operation in order to guide the operator in shifting the ribbon selecting mechanism.

The machine further includes a card or sheet, as a sheet of paper movable between the ribbons and the punch hole to be perforated by the punch when punching the ribbon, and means for automatically feeding the sheet. This sheet is used as a control for controlling the operation of the frames of the loom, or the setting up and operation of the warp carrying frames and weft carrying shuttles. The use of the sheet in the loom forms no part of this invention, and the making of the sheet at the same time as the making of the pattern or design is the only feature pertinent to this invention insofar as the sheet or card is concerned.

In the illustrated embodiment of our invention, the carrier for the cellular sheet is stationary, and the carrier for the punch and ribbon mechanism shiftable laterally step by step along a line or the row of cells, and lengthwise, or vertically, or at right angle to the feeding movement from one line of cells to the other to effect a line spacing operation, after the manner of the platen roll of a typewriter.

Figure 1:
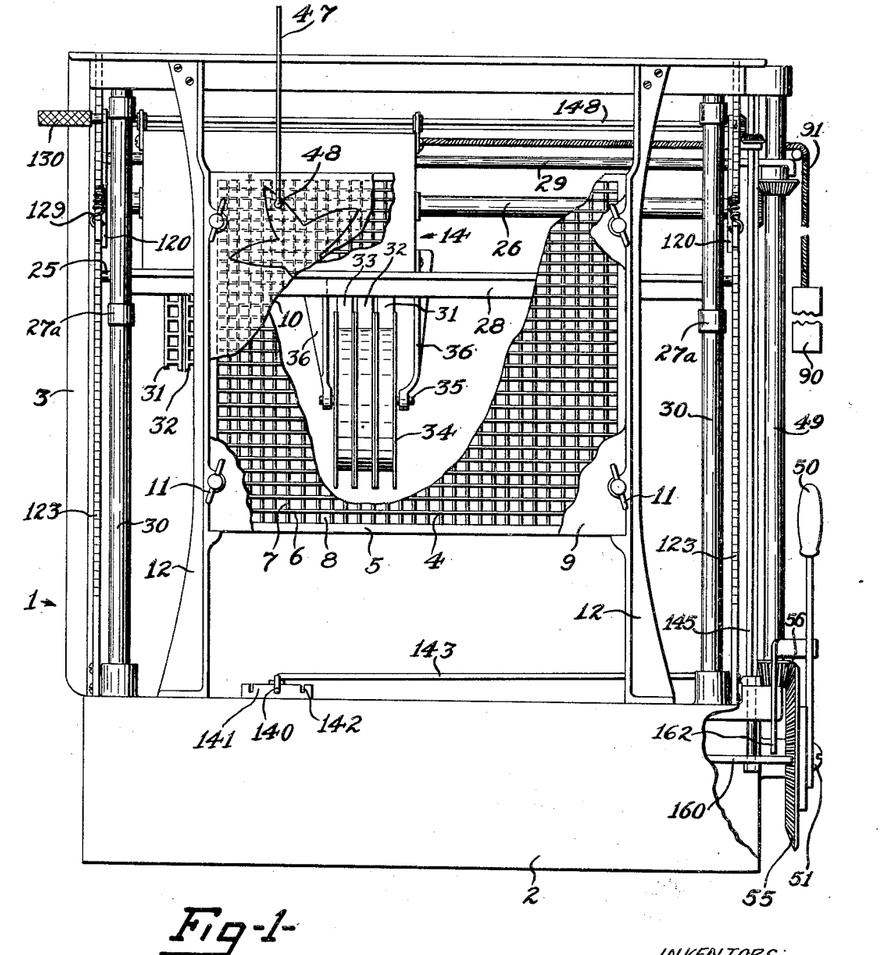
Figure 1 is a front elevation, partly broken away, and parts being omitted, of this machine.
Figures 2, 18:
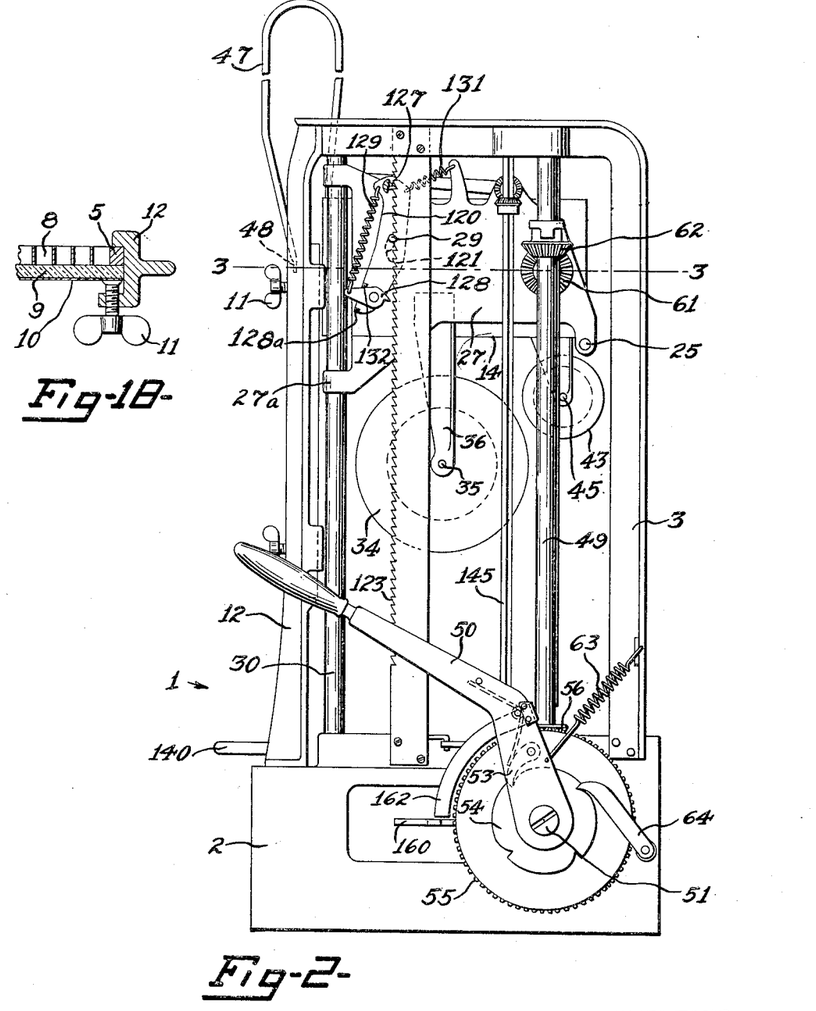
Figure 2 is a side elevation, looking to the left in Figure 1.
Figure 18 is a fragmentary detail view of the cellular plate and contiguous parts.

1 designates the main frame of the machine, it including a base 2, and an upright skeleton frame 3 rising from the base, this skeleton frame as seen in Figure 1 being substantially square in front view, and oblong in side elevation, that is, as viewed in Figure 2.

4 designates the cellular plate, this being preferably flat and formed up of sheet metal to have a marginal frame 5, and partitions 6, 7 arranged at an angle to each other to form the cells 8, the cells extending over practically the entire area of the plate. The cellular plate is usually overlaid with a cover plate 9 as of glass, and this glass plate is overlaid with a sheet 10 usually of paper on which the colored design to be duplicated has been painted by the artist. These three parts are clamped together, as by thumb screws 11, Figures 1 and 18, and secured in frame bars 12.

Figure 3:
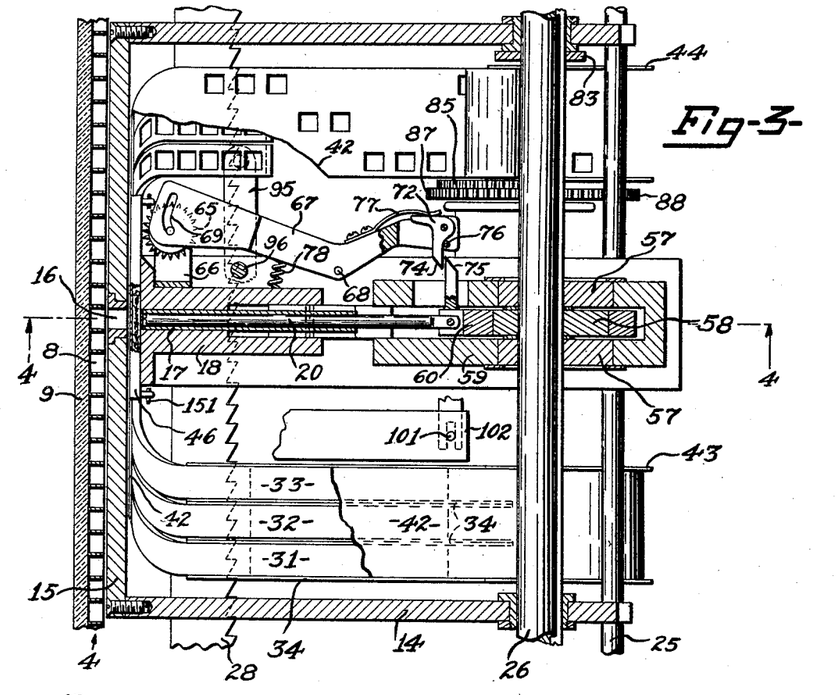
Figure 3 is an enlarged, horizontal, sectional view through the movable carriage, taken approximately on the plane of line 3—3, Figure 2.
Figure 4:
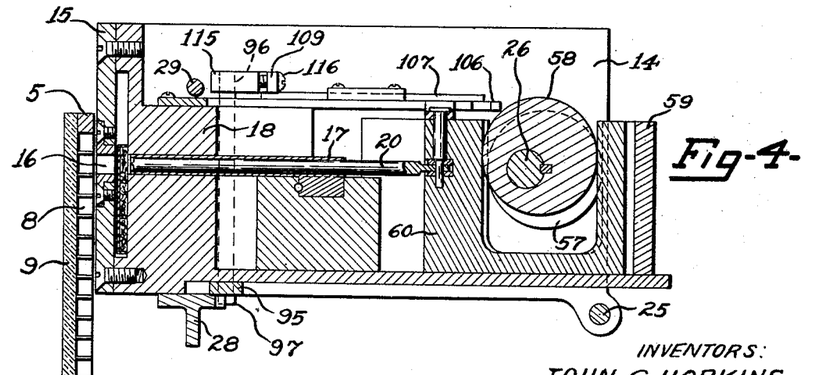
Figure 4 is a sectional view on line 4—4, Figure 3.

14, Figures 3 and 4, designates the carrier for the punch and ribbon mechanism, this embodying a punch plate 15 underlying the cellular plate 4, and having a punch hole 16 for alinement with the cells 8.

17 is the punch movable in a suitable guide 18 forming part of the carrier 14, this being alined with the punch hole 16, and coacting with the edges of said hole to shear or punch out a block from a ribbon to be described, and move it into the punch hole 16.

Figures 8, 11:
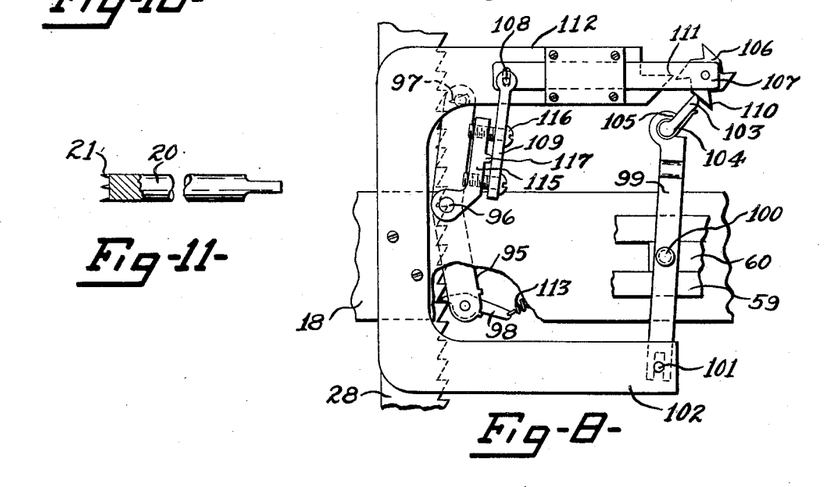
Figures 8 and 9 are fragmentary detail views of the escapement for controlling the feeding of the shiftable carriage transversely step by step.
Figure 11 is a detail view of the stripper.

In order to move the punched out block from the punch hole 16 into the cell 8 against the glass plate 9, the punch is provided with additional means as what might be called, a stripper 20 movable axially of the punch 17, the punch being tubular, and the stripper movable in the tubular punch. The punch and the stripper are actuated, as will be hereinafter described in connection with the entire actuating mechanism. As seen in Figure 11, the stripper 20 is provided with fine points or pins 21 projecting in advance thereof.

The carrier 14 is mounted to shift transversely of the frame along suitable guides, as shafts 25 and 26, and a rack 28; these shafts and rack being supported by a main or line spacing carriage 27. The main carriage is shiftable at an angle to the transverse movement of the carriage 14, that is, vertically Figure 1, it being here shown as having guides 27ª slidable along the upright rods 30 supported by the main frame, or the rectangular skeleton portion 3 thereof.

31, 32 and 33 are different colored ribbons, three of such ribbons being here shown. These are wound on spools 34 and unwind from said spools. The spools 34 are mounted on an axle 35 carried by brackets 36 on the carriage 14. The ribbons pass from the spools 34 across the punch hole 16, and are guided across the punch hole by guides or troughs 37. The ribbons fall after being punched in loose piles in the frame where they are removed from time to time.

Figures 5, 7:
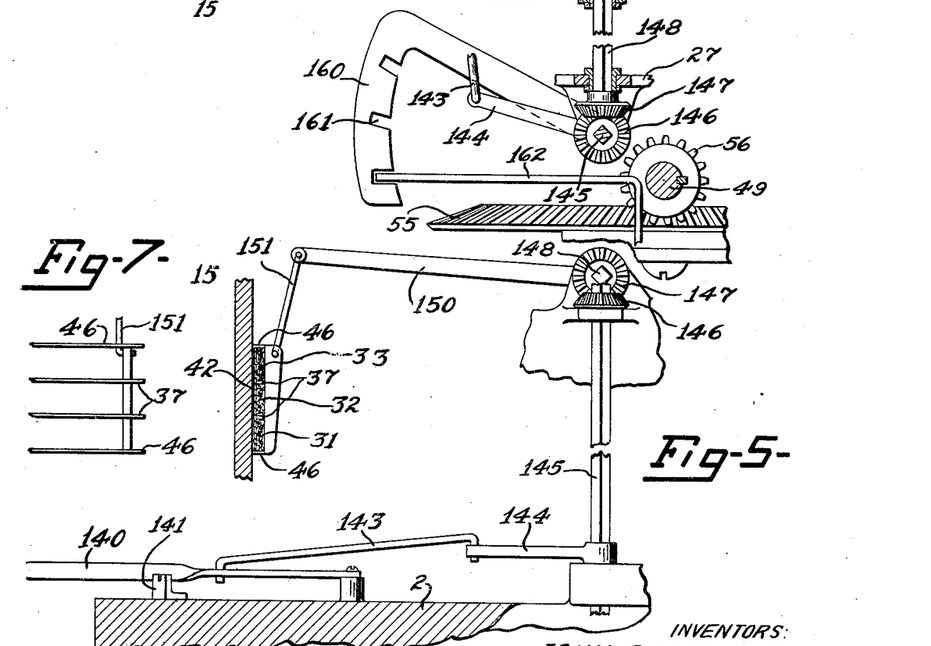
Figure 5 is a fragmentary detail view, parts being omitted, illustrating the ribbon shifting mechanism.
Figure 7 is a detail view of the guides for the ribbons.

42 designates the paper sheet or card to be prepared for use in the loom. This sheet 42 moves over the ribbons between the ribbons and the punch plate 15. It is wound on a spool 43 and winds upon a similar spool 44, these spools being mounted upon a shaft 45 mounted in the carriage 14, and it is guided across the punch hole by a suitable trough or guide 46 overlying the guides 37, see Figure 5. The ribbons and the sheet 42 are shifted relatively to the punch hole 16 by shifting the guides 37 and 46, and are fed lengthwise, as will be hereinafter described.

An index 47 is carried by the carriage 14 and extends outward, or upward therefrom with its end 48 overhanging the sheet 10 in order to point out on the sheet 10, the color of the portion of the design on the sheet 10 to be duplicated so that the operator can shift the ribbons to bring the ribbon of the desired color opposite the punch hole.

The general operation is as follows:

The parts are set so that the end 48 of the index 47 points to the uppermost left hand corner of the sheet 10 on which the painted design appears, and over the left hand cell 8 of the top line of cells. Of course, it may be set to start at any other point, but in this example, it is assumed that it starts in the upper left hand corner. The ribbons are shifted to bring the ribbon of the color corresponding to that on the painted sheet pointed out by the index, opposite the punch hole 16. The punch mechanism is then actuated punching out a piece from the ribbon selected, and punching it into the punch hole 16, and thereafter, due to the timing of the actuating mechanism, the stripper pushes the cutout piece into the alined cell 8 against the plate 9. At the same time, it punches out a piece from the paper sheet 42, this being interposed between the punch from the ribbon and the glass plate 9. Thereafter, the punch and the stripper withdraw and the ribbon and sheet are fed one step, and also the carrier 14 fed one step to aline the punch hole with the next cell in the horizontal row.

These operations are normally repeated along the horizontal row with each operation, the operator shifting the ribbons to select a ribbon of the color corresponding to that pointed out on the paper sheet by the pointer 47. When the end of the row is reached, the carrier 27 is shifted one step to effect the line spacing operation or bring the punch hole and punch mechanism in juxtaposition to the next row of cells, and also the carriage 14 is returned to the left hand side of the frame to begin at the left hand end of the next row. When all the punching operations are completed, the glass plate is removed, and the paper punchings brushed off, leaving the design made by the pieces of the ribbon exposed giving an accurate idea of how the final woven design will appear.

It is obvious that by using two color ribbons, that is, ribbons having one color on one side and a different color on the other side or by using pairs of ribbons of different color superimposed upon each other, the same design would appear in different colors on each side of the frame.

The actuating mechanism for bringing about these various relative movements will now be described.

The actuating mechanism for the punch 17 and the stripper 20 comprises a drive shaft 49 journalled in the main frame 1, or the parts 2, 3 thereof, and here shown as extending vertically, a prime mover or driver for the shaft 49, and motion transmitting means between the shaft 49 and the punch 17 and stripper 20, which motion transmitting means is so mounted as to partake of the lateral feeding of the carriage 14, and the vertical shifting or line spacing movement of the carriage 14 and the carriage 27 along the guide rods 30.

The prime mover is here shown as an oscillating lever 50, see Figures 1 and 2, mounted on a suitable axle 51 in the base 2 and having a clutch device as a pawl 53 coacting with a ratchet wheel 54 on said shaft 51, the ratchet wheel being fixed to a beveled gear 55 meshing with a beveled gear 56 on the shaft 49, the teeth of the ratchet wheel 54 being so spaced, and the ratio of the gearing being such that the lever 50 imparts a complete in and out movement to the punch 17 and stripper 20 during one operation thereof.

The motion transmitting means between the shaft 49 and the punch and stripper, as here shown comprises cams 57, 58 slidably mounted on the shaft 26 to be rotated thereby, and the cams 57 coacting with followers 59 provided on the inner end of the punch 17, and the cam 58 coacting with a follower 60 connected to the stripper 20, a beveled gear 61 mounted on one end of the shaft 26 and meshing with a beveled gear 62 on the shaft 49, which gear is shiftable axially of the shaft with the main carriage 27. The movement of the actuating lever 50 is against the action of a returning spring 63. Also, the ratchet wheel 54 and gear 55 is held from retrograde movement by a pawl 64.

The ribbons unwind from the spools 34, pass the punching point or hole 16 and the punched ribbons accumulate anywhere in a pile, from which they are removed at suitable intervals. The ribbons pass from the spools 34, through the troughs or guides 37, and are unwound from the spools 34 by mechanism actuated from the shaft 26 and timed with the operation of the punch to feed the ribbon from which the punching has been made after the punch is withdrawn. The ribbon feeding mechanism is here shown as actuated from the punch mechanism, but obviously, may be actuated from any other movable part.

As seen in Figures 3, 12, 13, 14 and 15, this feeding mechanism comprises a pointed or spur wheel 65 mounted in a suitable bracket 66 on the carrier 14, or the punch guide 18 thereof, this spur wheel being here shown as double and arranged to hook into the selected ribbon. The axle of the wheel is mounted in a slot in the bracket 66 to permit the wheel to have a movement toward and from the ribbon to engage and disengage the spurs and the ribbon, and an actuator for the wheel to shift it and turn it, this actuator being connected to the stripper 20 to be actuated thereby.

The actuator is here shown as a lever 67 pivoted at 68 to a fixed point within the carrier 14, and having a cam slot 69 for receiving the axle of the spur wheel 65, and also having a pawl 70 for coacting with pins or teeth 71 spaced apart on one side of the spur wheel.

Figures 12, 13, 15, 16, 17:
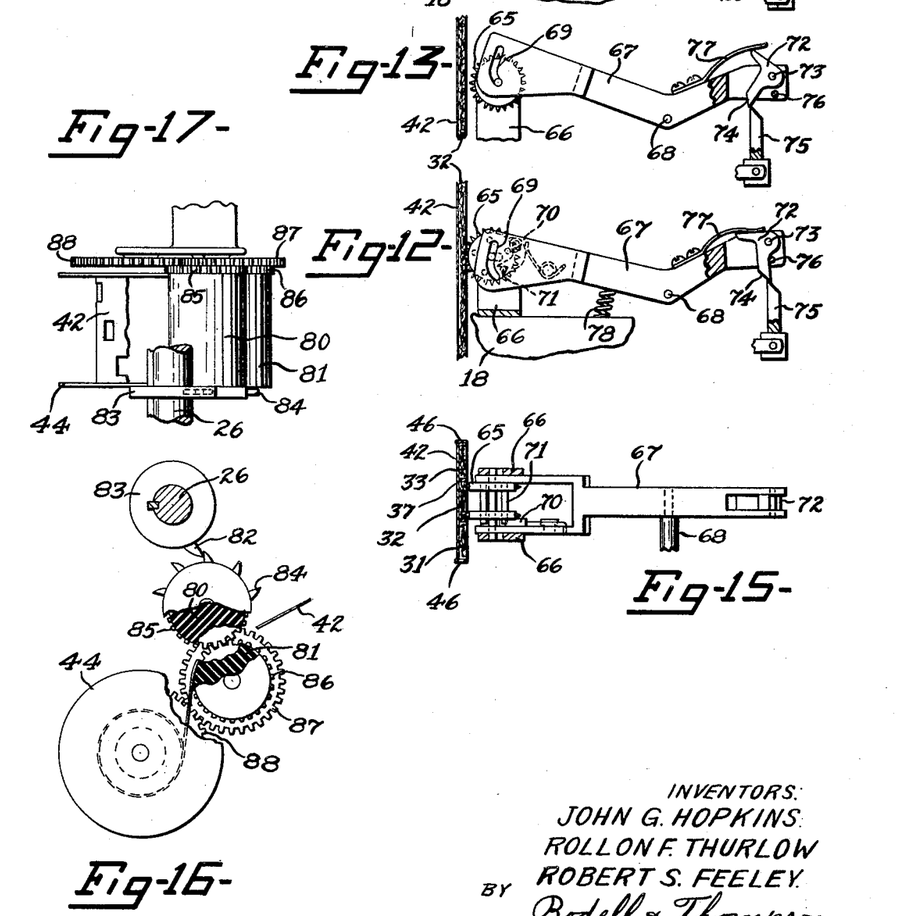
Figures 12, 13 and 14 are detail views of the feed mechanism for the ribbons showing different positions assumed thereby during its operation.
Figure 15 is an elevation, partly in section, looking upward in Figure 12.
Figure 16 is a fragmentary, detail view of the paper feeding mechanism, looking to the right in Figure 1.
Figure 17 is a plan of the mechanism shown in Figure 16.
Figure 14:
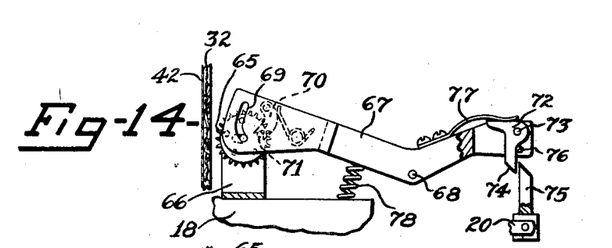

A one-way clutch device is provided between the lever 67 and its mover, in this instance, the stripper 20, or the follower 60. The one-way clutch device here shown comprises a spring pressed angular pawl 72 pivoted at 73 to the end of the lever 67 remote from the spur wheel 65, and having one arm thereof provided with a beveled face 74 which coacts with the beveled shoulder 75 fixed to the stripper 20, or the follower 60 thereof. A stop 76 coacts with the pawl 72 to prevent pivotal movement thereof in one direction. During the forward movement of the stripper, the shoulder 75 engages the pawl 72, as shown in Figure 14, and tilts the pawl on its pivot against the action of a returning spring 77, as shown in Figure 13, and finally ratchets past the pawl 72. When the stripper is being returned to its starting position, the beveled face of the shoulder 75 engages the beveled face 74 of the pawl 72, and the pawl being now held from pivotal movement by the pin 76, a tilting movement upward, Figure 12, is given to the adjacent end of the lever 67, due to the cam action of the beveled face of the shoulder 75 on the beveled face 74 of the pawl. This causes the other end carrying the spur wheel to move downward. During this movement, the cam slot 69 shifts the spur wheel so that its spurs dig into the ribbon and the ribbon is fed upward (Figure 12), due to the turning movement of the spur wheel by the pawl 71. When the shoulder 75 clears the pawl 72, a spring 78 returns the lever to its starting position and hence, withdraws the spur wheel from the ribbon.

The means for feeding the paper 42 from the spool 43 to the spool 44 is actuated from the shaft 26 and acts on the spool 44. This means is best shown in Figures 16 and 17, and comprises a pair of rolls 80 and 81 located adjacent the spool 44 and actuated from the shaft 26 through a radial arm or tooth 82 provided on a disk 83 slidably keyed to the shaft, the arm coacting with any one of a plurality of corresponding arms 84 on the roll 80, or a wheel at one end of the roll. The rolls 80 and 81 are preferably rubber, and at one end of the roll 80 is a gear wheel 85 meshing with a gear wheel 86 at one end of the roll 81, and the roll 81 also has a gear wheel 87 meshing with the gear wheel 88 on the spool 44. During each actuation of the handle lever 50, the shaft 26 is actuated through the gears 62, 61 causing the disk 83 to make a rotation and through the radial arms 82, 84, give the roll 80 a partial turn, the motion of the roll 80 being communicated through the gears 85, 86 to the roll 81, and from the roll 81 to the spool 44 through the gears 87, 88, this feeding movement occurring at the end of the rotation of the shaft 26 after the punch is operated and while the ribbons are being actuated. At the first, the paper 42 is wound loosely on the spool 44, but thereafter tightens as the amount of paper wound on the spool 44 increases. Thus, no compensating mechanism need be provided for adjusting the feed as the roll of paper on the spool 44 gets larger.

The carriage 14 is fed step by step to the right automatically, and is returned by hand to the left to its starting position. The step by step feed to the right is controlled by the actuating mechanism, and an escapement coacting with the rack 28.

Figure 9:
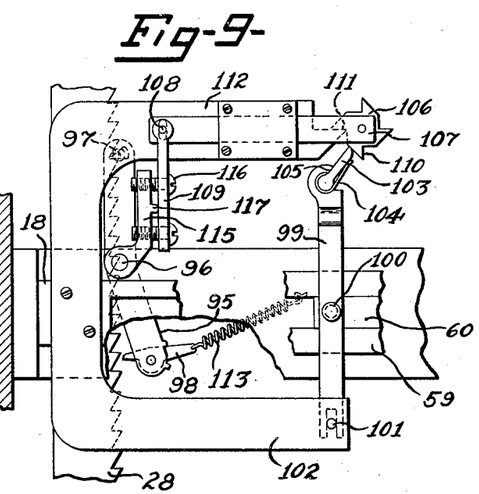
Figure 10:
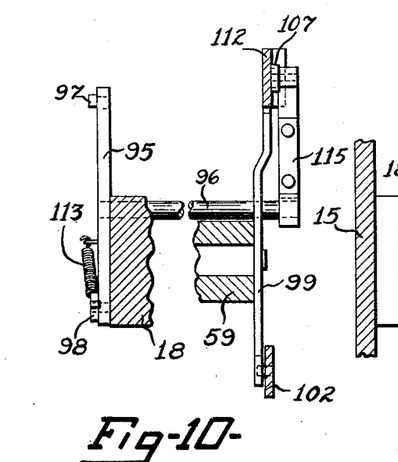
Figure 10 is a fragmentary, detail view of parts seen in Figure 9, looking to the right in Figure 9.

90 is a weight secured by a cable 91 to the carriage 14 and tending to pull it to the right. The escapement mechanism for controlling the feed of the carriage to the right by the weight as seen in Figures 8 and 9, is actuated from the punch mechanism, and as here shown comprises an escapement lever 95 pivoted between its ends at 96 to the carriage 14 and having a tooth 97 at one end normally engaged with the rack 28 to prevent movement of the carriage by the weight 90 and having a tooth or pawl 98 at its other end normally out of engagement with the rack, and movable into engagement therewith to temporarily hold the rack from movement after the carriage 14 has been fed one step, and until the tooth 97 can again engage the rack. This lever 95 is actuated, as before stated, from the punch mechanism, and as here shown, it is actuated from the follower 60 which coacts with the cam 58 and comprises a lever 99 pivoted between its ends at 100 to the follower 60, and having one arm pivoted at 101 to a bracket 102 secured to the carriage 14, and its other end coacting with connections to the escapement lever 95. As here illustrated, the other end of the lever 99 is provided with a pawl 103 acted on by a spring 104, which normally holds it against a stop 105. This pawl coacts with a ratchet wheel 106 pivoted at one end of a link 107, the other end of which is connected at 108 by a pin-and-slot connection to an arm 109 connected to the lever 95. During the forward movement of the punch and stripper, this pawl 103 is carried to the left from the position shown in Figure 9, and is thereby positioned to engage a tooth 110 of the wheel 106 during retrograde movement of the stripper. Another tooth of the wheel 106 is slidably engaged with a stop surface 111 on an arm 112 of the bracket 102.

During retrograde movement of the punch mechanism or stripper, the lever 99 is moved in a clockwise direction, Figure 9, and pressing against the end of the adjacent tooth 110 of the wheel 106, pulls the link 107 to the right as the wheel 106 is held from turning by reason of one of its teeth engaging the stop 111, and when the link 107 has been moved to the right far enough to permit the tooth to clear the stop 111, as seen in Figure 8, the wheel 106 being free to turn, the link 107 is relieved of the force of the lever 99, and is returned to the left by a spring 113. During the movement to the right of the link 107, the tooth 97 is withdrawn from the rack and the pawl 98 is moved into the path of another tooth of the rack, so that the carriage 14 is free to move to the right by the weight 90, until a tooth of the rack engages the pawl 98 and the pivotal movement of the pawl stopped. When the wheel 106 clears the stop surface 111, the spring 113 reacts moving the lever 95 into the position shown in Figure 9, wherein the tooth 97 is again engaged with the rack and the pawl 98 is out of engagement with the rack. The pawl 98 is here shown as pivoted, and one end of the spring 113 is secured thereto so that when the weight feeds the carriage 14 one step, the pawl 98 is tilted on its pivot against the action of the spring 113 into the position shown in Figure 8, and when the wheel 106 clears the stop 111, and the weight 90 is free to act on the carriage, the pawl 98 is titled against the spring 113 until limited in its pivotal or tilting movement by a stop, the carriage 14 feeding one step during retrograde movement of the pawl 98 against the spring 113. The index 47 is used as a handle for returning the carriage 14 to the left (Figure 1).

The arm 109 is adjustably secured to the lever 95, and as here shown, it is secured to an arm 115 mounted on the axle 96 of the lever 95 by adjusting screws 116 extending on opposite sides of a fulcrum point 117 on the arm 115. This construction is merely for a fine adjustment of the escapement mechanism.

The carriage 27 which effects what might be called the line spacing, is controlled in the line spacing operation by a hand operated escapement, here illustrated as a lever 120, Figure 2 mounted on a shaft 29, which in turn is mounted in slots 121 in the carriage 27, the lever 120 having teeth at its opposite ends coacting with a vertical stationary rack 123 supported by a main frame. There are two of such racks and two of such escapement levers 120 mounted on opposite sides of the frame, and on opposite ends of the shaft 29. The slots 121 permit the bodily movement of the shaft 29 in the carriage 27. 127 designates a fixed tooth at one end of the lever 120, and 128 a pawl at the other end of the lever 120, the pawl 128 being acted upon by a spring 129. The lever 120 at one side of the frame is provided with a suitable handle 130 by means of which it is rocked, and the rocking motion thereof transferred to the lever 120 at the other side of the frame through the shaft 29. The carriage 27 moves downwardly by gravity to effect the line spacing.

The handle 130 is operated to withdraw the tooth 127 from the rack 123 and moving the tooth of the pawl 128 into engagement with the rack, whereupon the carriage 27 moves downwardly under its weight until the pivotal movement of the pawl is limited by coming in engagement with the stop 128ª. Upon release of the handle, a returning spring 131 reacts on the lever 120, and again moves the tooth 127 into engagement with the rack moving the pawl 128 out of engagement with the rack, the spring 129 reacting until the pawl 128 engages another stop shoulder 132. The carriage 27 is returned to its topmost position by merely sliding it upwardly, the tooth 127 ratcheting during this operation, owing to the ratcheting movement of the lever 120 against the spring 131. Any other suitable escapement mechanism may be employed.

Figure 6:
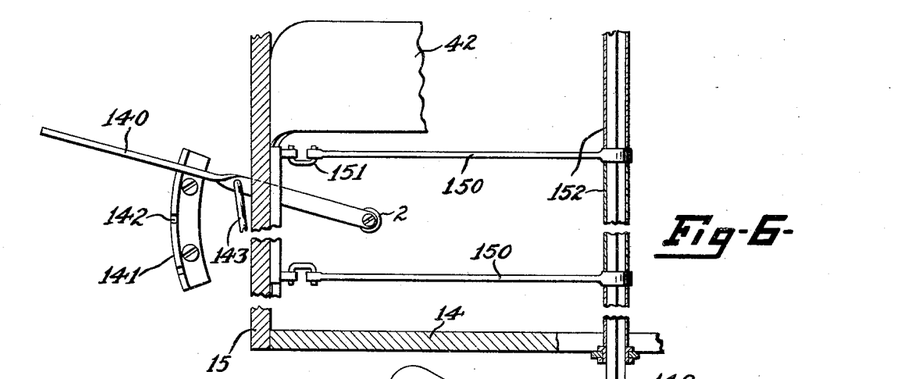
Figure 6 is a plan view looking down on parts seen in Figure 5.

The means for shifting the ribbons to bring any one of them into a position where it extends across the punch hole 16 acts on the ribbon guides 37, this means also shifting the paper 42. This means is here shown as a lever 140, see Figures 1, 5 and 6, pivoted to the frame 1, and coacting with a rack 141 having spaced notches 142 therein, there being one notch for each ribbon, and the lever is connected by a link 143 to a rock arm 144 mounted on a shaft 145, this shaft extending vertically of the main frame, and having a beveled pinion 146 at its upper end meshing with a beveled pinion 147 on a shaft 148 extending transversely of the frame and provided with rock arms 150 which are connected by means of links 151 to the ribbon guides or shoes 37. In order that the rock arms may travel with the carriage 14, the arms 150 are so connected to the shaft 148 as to slide axially of said shaft during the shifting of the carriage 14, and as here shown, the shaft 148 is square, and the arms slidably fit the shaft 148. The shaft 148 is journalled in the carriage 27, and the gear 146 is slidably mounted on its shaft 145 to slide along the shaft during the vertical or line spacing operation of the carriage 27. The gear 62 is also slidably mounted on the shaft 49 to stay in mesh with the gear 61 during the line spacing operation. The arms 150 are spaced apart in the carriage 14 by spacers 152.

Obviously, upon movement of the lever 140, the shaft 148 will be rocked thus through the gears 146 and 147, rocking the arms 150 to shift the guides 37 for the ribbons and the paper, and during movement of the carriage 14 to the right or left, the arms 150 will slide along the shaft 148, and during the line spacing operation, the gear 146 will slide along the shaft 145.

In order to prevent actuation of the lever 50 to operate the punch unless the lever 140 has been operated into any one of the notches 142, an interlocking means is provided. This means is here shown, as a segment 160 carried on the shaft 145, and having notches 161 corresponding to the notches 142, and the operating lever 50 is provided with an arcuate shield 162, which moves transversely of the segment 160, and prevents the operation of the lever 50, unless the guard 162 is alined with one of the notches 161.

In operation, the painted, or otherwise artist prepared design on a paper sheet is placed on the glass 9 overlying the cellular plate 4, the carriage 14 shifted to the left and upwardly into its uppermost position. Assuming that the point 48 of the pointer 47 is opposite the left hand cell of the top line, the operator notes the color on the painted design underlying the pointer 48, and shifts the ribbon mechanism by moving the lever 140 to bring the corresponding colored ribbon opposite the punch hole 16. He then operates the lever 50 downwardly and thus, through the gears 55, 56 and shaft 49, and gears 62 and 61, rotates the shaft 26 one complete revolution which actuates the cams 57 to move the punch through the selected ribbon and the overlying paper sheet 42 and thereafter, actuating the cam 58 to actuate the stripper 20 to move the punchings through the punch hole 16 into the alined cell 8. The rotation of the shaft 26 thus reciprocates the punch 17, and stripper, and during the return portion of the reciprocating movement, the lever 67 is actuated to feed the selected ribbon one step without feeding the other, and at the same time, the rolls 80 and 81 are actuated to feed the paper strip by the radial arm 82 which is mounted on the shaft 26.

Also, during the retrograde or withdrawing movement of the stripper, the escapement lever 95 is operated through the lever 99, pawl 103, wheel 106, and link 111 to permit the carriage 14 to make one step to the right bringing the next cell in the first line into juxtaposition to the punch mechanism. Repeated operations of the lever 50 will bring the cells of the first line successively into juxtaposition to the punch mechanism. When the carriage 14 has been moved step by step to the right its extreme distance, the carriage 14 is shifted to the left by hand, and the handle 130 is operated to operate the escapement levers 120, permitting the mechanism carried by the carriage 14 to drop one step, or in position in alinement with the next line. That is, the line spacing operation is performed. These operations are repeated until the entire face of the cellular plate has been covered. The paper sheet and glass 9 is then removed, and the paper punchings from the sheet 42 brushed off, so that the design appears as it will appear in the woven article, the appearance being given by the blocks of colored ribbons in the different cells 8. If this design is not satisfactory, the colors of the ribbons can be changed, and the design remade, but in no case is it necessary to make trial runs in a loom to ascertain what the appearance of the design will be. The paper sheet 42 may if desired, be used in the loom as a card to control the operations of the frames of the loom. This feature however, as before stated, forms no part of this invention.

This invention is particularly advantageous in that the appearance of the design or pattern to be reproduced in a rug, carpet or other woven article, can be adequately ascertained with little expense without making any trial runs.

What we claim is:

1. In a design making machine, the combination of a cellular plate having cells arranged in lines, and mechanism for supporting ribbons of different colors, and selectively punching pieces from said ribbons and forcing them into the cells one by one.

2. In a design making machine, the combination of a cellular plate, and mechanism for supporting a plurality of different colored ribbons, for selectively punching pieces from said ribbons and forcing them in the cells one by one, and feeding the ribbons, and means for effecting relative feeding movement of the cellular plate and said mechanism to bring the cells one by one and said mechanism into juxtaposition along one line of cells, and said plate and mechanism having relative movement in a direction at an angle to the feeding movement to effect a line spacing operation from one line of cells to the other, and means for effecting said relative movement.

3. In a design making machine, the combination of a cellular plate, and mechanism for supporting a plurality of different colored ribbons, for selectively punching pieces from said ribbons and forcing them in the cells one by one, and feeding the ribbons, and means for effecting relative feeding movement of the cellular plate and said mechanism to bring the cells one by one and said mechanism into juxtaposition along one line of cells, and said plate and mechanism having relative movement in a direction at an angle to the feeding movement to effect a line spacing operation from one line of cells to the other, and means for effecting consecutive operation of the punching and ribbon feeding mechanism, and the relative shifting movement of said mechanism and the cellular plate.

4. In a design making machine, the combination of a cellular plate, and mechanism for supporting a plurality of different colored ribbons, for selectively punching pieces from said ribbons and forcing them in the cells one by one, and feeding the ribbons, and means for effecting relative feeding movement of the cellular plate and said mechanism to bring the cells one by one and said mechanism into juxtaposition along one line of cells, and said plate and mechanism having relative movement in a direction at an angle to the feeding movement to effect a line spacing operation from one line of cells to the other, and means for effecting consecutive operation of the punching and ribbon feeding mechanism, and the relative feeding movement of said mechanism and the cellular plate, including a single operating member.

5. In a design making machine, the combination of a cellular plate having cells arranged in lines, a punch plate having an opening therethrough, a punch movable into and out of the opening, a plurality of ribbons shiftable into a position whereby one extends across the punch opening, and means for effecting relative movement of the cellular plate and the punch to bring the punch hole and the cells of the plate one by one into alinement.

6. In a design making machine, the combination of a cellular plate having cells arranged in lines, a punch plate having an opening therethrough, a punch movable into and out of the opening, a plurality of ribbons shiftable into a position whereby they extend across the punch opening, means for effecting relative movement of the cellular plate and the punch mechanism to bring the punch hole and the cells of the plate one by one into alinement, and means for effecting relative movement of the cellular plate and the punch mechanism in a direction at an angle to the feeding movement to effect a line spacing operation from one line of cells to the next.

7. In a design making machine, the combination of a cellular plate having cells arranged in lines, punch mechanism comprising a punch plate having a punch hole therethrough, a punch movable into and out of the hole, a plurality of ribbons selectively shiftable into a position, whereby one extends across the punch hole, and means for shifting the punch mechanism, feeding the ribbons, actuating the punch, and effecting relative feeding movement of the cellular plate and punch mechanism to bring the cells one by one and the punch hole into alinement.

8. In a design making machine, the combination of a cellular plate having cells arranged in lines, punch mechanism comprising a punch plate having a punch hole therethrough, a punch movable into and out of the hole, a plurality of ribbons selectively shiftable into a position, whereby one extends across the punch hole, and means for shifting the punch mechanism, feeding the ribbons, actuating the punch, and effecting relative feeding movement of the cellular plate and punch mechanism to bring the cells one by one and the punch hole into alinement, said means including a single operating member.

9. In a design making machine, the combination of a frame, a cellular plate attached to the frame, a lengthwise movable carriage, and a cross feed carriage mounted on the lengthwise carriage, punch mechanism carried by the cross feed carriage and comprising a punch plate having a hole for alinement with the cells of the cellular plate one by one, a punch movable through the hole, a plurality of different colored ribbons supported by the cross feed carriage, means for shifting the ribbons so that any one of them extends across the punch hole, and mechanism for actuating the punch, feeding the ribbon and effecting the actuation of the cross feed carriage.

10. In a design making machine, the combination of a frame, a cellular plate attached to the frame, a lengthwise movable carriage, and a cross feed carriage mounted on the lengthwise carriage, punch mechanism carried by the cross feed carriage and comprising a punch plate having a hole for alinement with the cells of the cellular plate one by one, a punch movable through the hole, a plurality of different colored ribbons supported by the cross feed carriage, and means for shifting the ribbons so that any one of them extends across the punch hole, mechanism for actuating the punch, feeding the ribbon and effecting the actuation of the cross feed carriage including a single operating member.

11. In a design making machine, the combination of a cellular plate having lines of cells, punch mechanism comprising a punch plate having a punch hole for alinement with the cells one by one, a punch member movable through the hole, a plurality of ribbons selectively shiftable to locate any one of them in juxtaposition to the hole and the punch member, means for feeding the ribbons, means for effecting relative movement of the plate and said mechanism to bring the punch hole and the cells one by one into alinement including an escapement, means for actuating the punch, and motion transmitting means between the punch actuating means, the ribbon feeding mechanism and the escapement.

12. In a design making machine, the combination of a cellular plate having lines of cells, punch mechanism comprising a punch plate having a punch hole for alinement with the cells one by one, a punch member movable through the hole, a plurality of ribbons selectively shiftable to locate any one of them in juxtaposition to the hole and the punch member, means for feeding the ribbons, means for effecting relative movement of the plate and said mechanism to bring the punch hole and the cells one by one into alinement including an escapement, means for actuating the punch, and motion transmitting means between the punch actuating means, the ribbon feeding mechanism and the escapement.

13. In a design making machine, the combination of a punch mechanism, a plurality of ribbons shiftable to bring any one of them in juxtaposition to the punch mechanism, means for shifting the ribbons, means for actuating the punch member and interlocking means between the ribbon shifting means and the actuating means to prevent movement of the actuating means until the ribbons have been shifted completely to any one of their shifted positions.

14. In a design machine, the combination of a cellular plate, means for supporting the design to be duplicated in said plate, a carriage, and punch mechanism supported by the carriage element, a plurality of ribbons carried by the carriage, a punch member for punching pieces from the ribbons and forcing them in the cells one by one, means for effecting relative movement of the cellular plate and the carriage to bring the cells one by one and the punch mechanism into alinement, and an index movable with the carriage and movable over the design, for the purpose set forth.

15. In a design making machine, the combination of a cellular plate having cells arranged in lines, mechanism for supporting ribbons of different colors and a blank sheet overlying the ribbons, and means for selectively punching pieces from said ribbons and the sheet and forcing the punchings into the cells one by one.

16. In a design making machine, the combination of a cellular plate having cells arranged in lines, a punch plate having an opening therethrough, a punch movable into and out of the opening, a plurality of ribbons shiftable into a position whereby one extends across the punch opening, a blank formula sheet movable across the opening and shiftable with the ribbons, and means for effecting relative movement of the cellular plate and the punch to bring the punch opening and the cells of the plate one by one into alinement and to effect the feeding of the ribbons and the sheet, and means for effecting the selective shifting of the ribbons.

17. The method of making trial designs of woven articles, which comprises selecting and stuffing into the holes of a cellular plate corresponding to the woven article, pieces of colored fabric as indicated by a design.

18. The method of making trial designs of woven articles as indicated by a design, which comprises selecting and stuffing into the holes of a cellular plate pieces of colored fabrics in accordance with said design.

In testimony whereof, we have hereunto signed our names, at Syracuse, in the county of Onondaga and State of New York, this 21st day of April, 1931.

JOHN G. HOPKINS.
ROLLON F. THURLOW.
ROBERT S. FEELEY.